US006748699B2

(12) United States Patent
Taylor

(10) Patent No.: US 6,748,699 B2
(45) Date of Patent: Jun. 15, 2004

(54) WATER FEATURES

(76) Inventor: Colin John Taylor, Fern Cottage, 430 Lickey Road, Rednall, Birmingham, B45 8UU (GB)

(*) Notice: Subject to any disclaimer, the term of this patent is extended or adjusted under 35 U.S.C. 154(b) by 0 days.

(21) Appl. No.: 09/989,609

(22) Filed: Nov. 20, 2001

(65) Prior Publication Data
US 2002/0059751 A1 May 23, 2002

(30) Foreign Application Priority Data
Nov. 22, 2000 (GB) ............................................. 0028447

(51) Int. Cl.⁷ .......................... A01G 25/00; A01G 9/02
(52) U.S. Cl. .............................. 47/79; 47/82; 47/65.5; 239/12; 239/23
(58) Field of Search ....................... 47/79, 82, 65.5, 47/866.6; 239/12, 23

(56) References Cited

U.S. PATENT DOCUMENTS

| 3,841,023 | A | * | 10/1974 | Carlyon | 47/38 |
| 4,056,899 | A | * | 11/1977 | Close | 47/79 |
| 4,371,995 | A | * | 2/1983 | Donhauser | 4/538 |
| 4,745,707 | A | * | 5/1988 | Newby | 47/32.7 |
| 4,937,972 | A | * | 7/1990 | Freitus | 47/62 |
| 4,986,027 | A | * | 1/1991 | Harvey | 47/59 |
| 5,044,120 | A | * | 9/1991 | Couch | 47/73 |
| 5,127,366 | A | | 7/1992 | Kim | |
| 5,440,836 | A | * | 8/1995 | Lee | 47/60 |
| 5,502,922 | A | * | 4/1996 | Shiomo | 47/62 |
| 5,509,232 | A | * | 4/1996 | Laubsch | 47/75 |
| 5,598,662 | A | * | 2/1997 | Droste | 47/39 |
| 5,637,361 | A | | 6/1997 | Scheurich | |
| 5,852,896 | A | * | 12/1998 | Flasch, Jr. | 47/48.5 |
| 5,966,868 | A | * | 10/1999 | Cox | 119/69.5 |
| 6,067,750 | A | * | 5/2000 | Lai | 47/62 |
| 6,109,827 | A | * | 8/2000 | Holloway, Jr. | 405/39 |
| 6,125,579 | A | * | 10/2000 | Pavelka | 47/79 |
| 6,173,530 | B1 | * | 1/2001 | Holt | 217/88 |
| 6,279,835 | B1 | * | 8/2001 | Hansen | 239/20 |
| 2002/0084346 | A1 | * | 7/2002 | Katzman | 239/17 |

FOREIGN PATENT DOCUMENTS

| DE | 29514083 | * | 9/1995 | ........... B05B/17/08 |
| DE | 296 09 777 | | 10/1996 | |
| DE | 295 14 083 | | 1/1997 | |
| DE | 19604400 C1 | * | 6/1997 | ............ A01G/9/02 |
| DE | 29501770 U1 | * | 6/1998 | ............ A01G/9/02 |
| JP | 406054629 A | * | 8/1992 | ........... A01G/27/00 |

* cited by examiner

Primary Examiner—Peter M. Poon
Assistant Examiner—Andrea M. Valenti
(74) Attorney, Agent, or Firm—Cantor Colburn LLP

(57) ABSTRACT

A combined water feature and planter is in the form of a rectangular trough formed by a one-piece plastics material hollow moulded shell. A base of the planter has drainage openings therein leading to respective drainage passages which extend through a water reservoir for water recycled through an ornamental pump. The drainage passages are thus isolated from the water reservoir so that liquid draining through the passages to the exterior of the trough does not mix with the water recycling through the pump and cannot thus contaminate it.

28 Claims, 3 Drawing Sheets

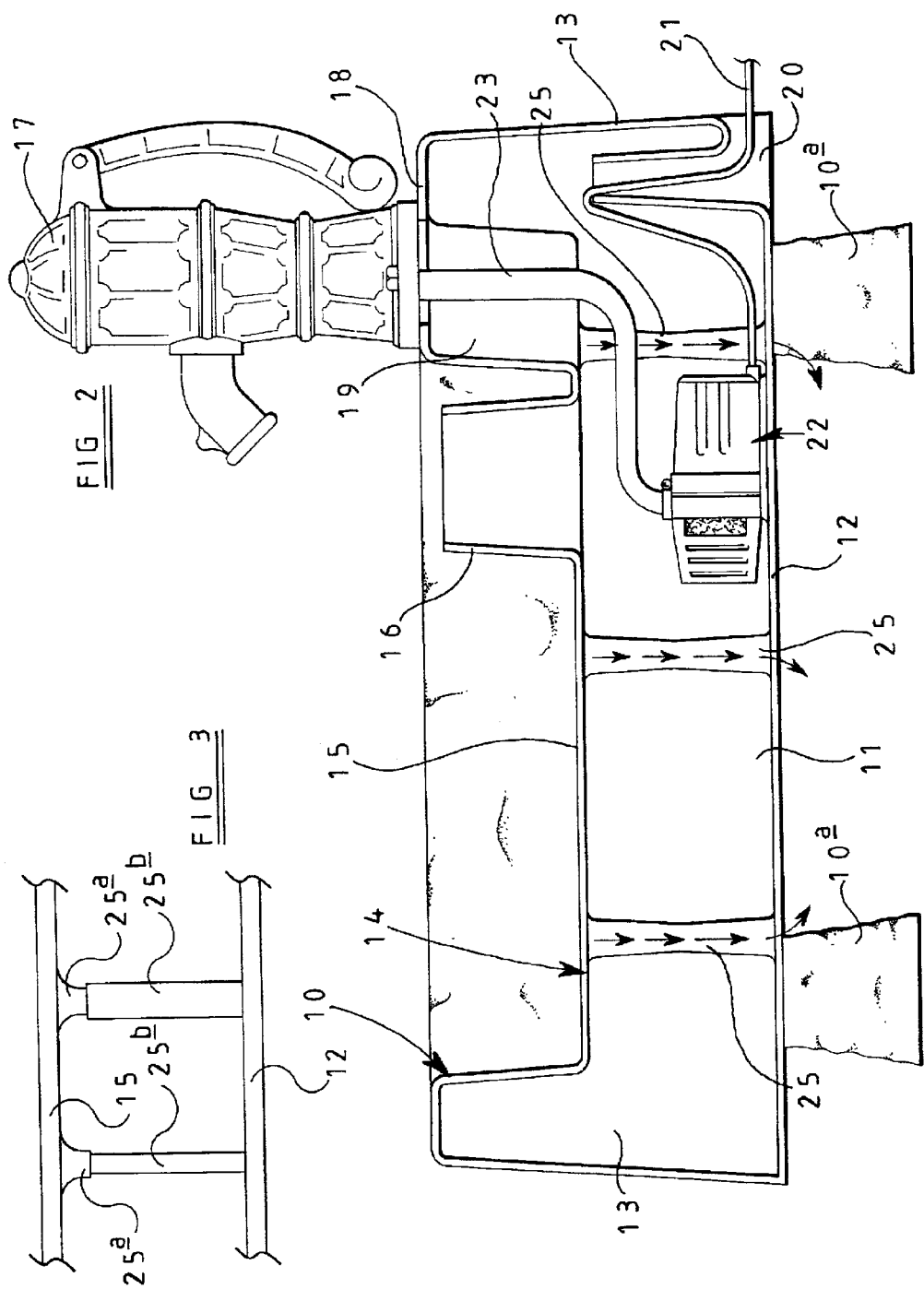

WATER FEATURES

TECHNICAL FIELD

This invention relates to an assembly for use as, or forming an accessory for, a water feature, and in particular relates to a combined water feature and planter.

BACKGROUND

It is known to incorporate planters in water features such as ornamental ponds, waterfalls, and drinking troughs, and generally the water feature includes a water reservoir from which water is pumped to a required part of the water feature. The planters normally have drain holes which communicate with the reservoir, so that the solution applied to water the plants, which solution may contain chemicals, such as nitrates, for feeding the plants, drains into the reservoir. Accordingly the water pumped around the water feature will become contaminated by such chemicals and represent a danger to anyone, particularly children, who may be tempted to drink from the water feature. DE 29514083U1 shows a water feature with planters generally of this type.

SUMMARY

According to the invention an assembly for use as, or forming an accessory for, a water feature comprises a water reservoir for water recycled, in use, around at least part of the assembly, and at least one planter having a drainage passage which extends through the water reservoir and isolates therefrom liquid draining from the planter, in use.

Preferably the assembly comprises a moulded plastics material hollow shell, which integrally defines said water reservoir and said at least one planter. Conveniently the drainage passage(s) extending through the water reservoir serves or serve to strengthen the shell.

BRIEF DESCRIPTION OF THE PREFERRED EMBODIMENT

Figure 1:
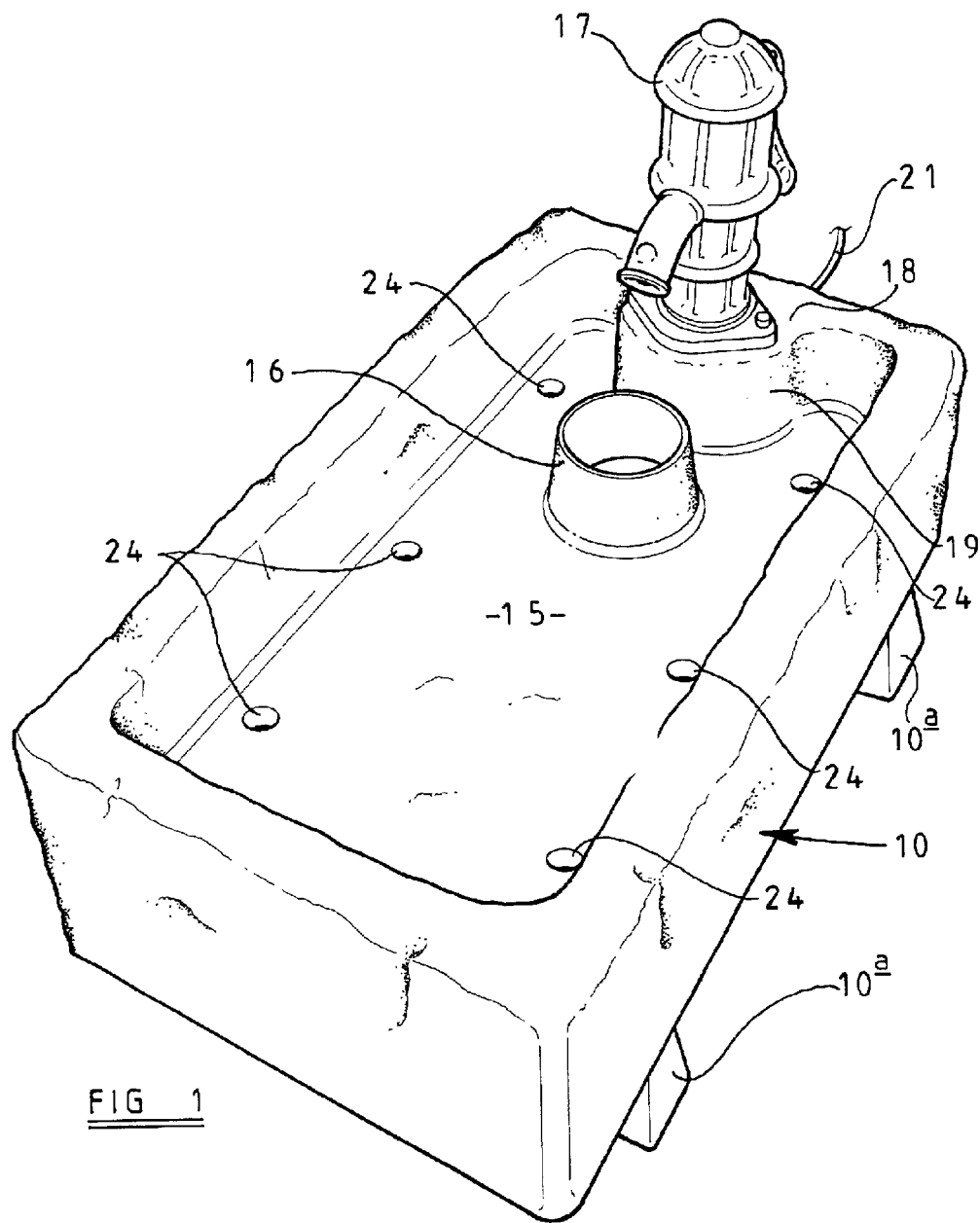
Figure 4:
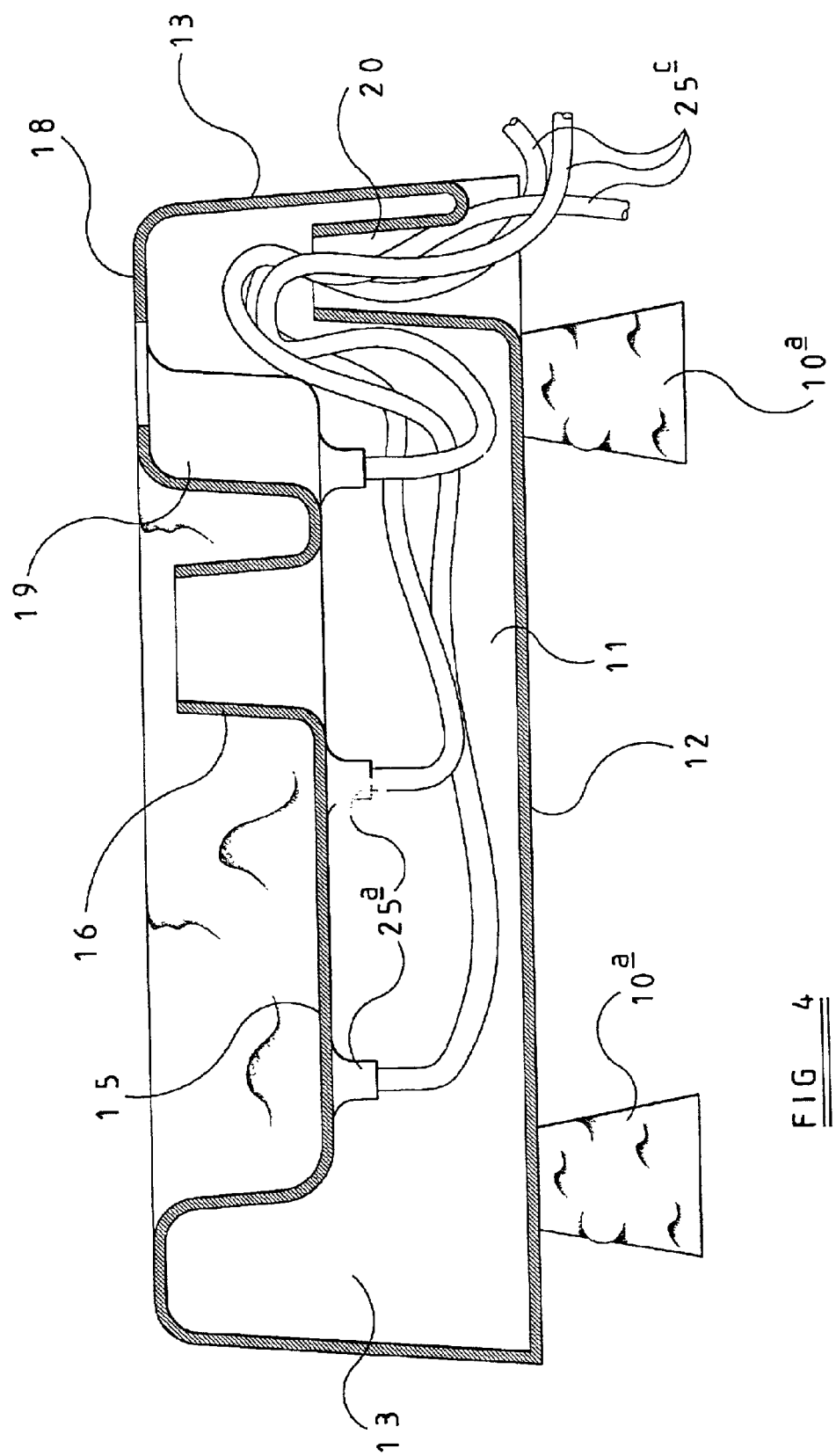

The invention will now be described, by way of example, with reference to the accompanying drawings, in which:

FIG. 1 is a perspective view of an assembly in the form of a combined water feature and planter in accordance with one embodiment of the invention, FIG. 2 is a part cross-sectional, central longitudinal view of the assembly of FIG. 1, and FIGS. 3 and 4 are respectively schematic fragmentary views of the interior of the assembly, showing further embodiments of drainage passages.

DETAILED DESCRIPTION OF THE PREFERRED EMBODIMENT

As shown in FIG. 1, the assembly which defines the combined water feature and planter of one embodiment of the invention is in the form of a rectangular trough formed by a one-piece plastics material hollow moulded shell 10, supported on separate legs 10a. The shell defines an internal water reservoir 11 between a base 12, side and end walls 13 and a top wall 14. The top wall 14 defines a flat part 15, which is recessed relative to the upper periphery of the trough and forms a base of the planter. The part 15 is formed with a raised, upwardly tapering hollow circular part 16, which forms a water receptacle of the water feature. The part 16 receives water, in use, discharged from an imitation ornamental hand pump 17 bolted to a platform 18 of an integral projection 19 formed of the upper wall 14 and disposed at one shorter end wall of the rectangular trough. The part 16 is spaced a short distance from the projection 19, so as to lie below the outlet of the pump 17. In use, water from the pump 17 thus falls through the hollow part back into the reservoir 11 below it. Although shown in this embodiment water discharges from an ornamental hand pump, any other suitable ornamental or other feature could be used instead.

In its base, at a position adjacent the end wall at which the projection 19 is disposed, the shell has an upstanding hollow circular part extending above the water level, and defining an opening 20 through which a sealed electrical supply cable 21 extends from the exterior of the assembly, the cable 21 leading to an electrical pump 22 disposed in the reservoir 11. The pump supplies water from the reservoir to the ornamental hand pump 17 by means of a pipe 23 which passes up through an opening in the platform 18 and into the bottom of the ornamental pump 17. Thus when the electrical pump is operating, in use, water from the reservoir 11 is continually being pumped up through the ornamental pump 17, whereupon it discharges under gravity from the outlet of the pump 17 into the part 16. As described, the water then falls through the part 16 and thus back into the reservoir 11.

The flat base part 15 of the planter is formed with a multiplicity of drainage openings 24 therein, each of which is at the top of a vertical hollow drainage passage 25 formed as part of the moulded shell and thus serving to strengthen it. Each passage extends through the full depth of the reservoir 11, from part 15 to base 12, and is thus isolated from the water therein, the passage terminating at an opening in the base 12 so as to provide a drain from the underside of the base 12 exteriorly of the shell. Each drainage passage 25 can be straight, of constant circular cross-section. Alternatively where the shell is moulded in two halves which are secured horizontally together, each half shell can define a half of the drainage passage, which can be of tapering circular section, as shown in FIG. 2, with the wider ends at the part 15 and base 12 respectively. The passages 25 could of course be of any other suitable configuration.

In one alternative arrangement, schematically shown in FIG. 3, the part 15 could be formed at each opening 24 with only a short downwards moulding 25a extending into the reservoir 11. The drainage passage is completed by a separate pipe or tube 25b fitted onto a spigot or into a socket at the end of the short moulding. The pipe or tube extends through the reservoir to an opening in the base 12, so that liquid can drain through the pipe or tube to the exterior of the shell. Instead of being integral with the base part 15, the parts 25a could be non-integral, e.g. inserts in the openings 24 which provide the spigot or socket. In a further alternative arrangement, very schematically shown in FIG. 4, the pipes 25b are replaced by longer flexible pipes 25c which pass into (and terminate in) the opening 20, so that the water from the planter(s) drains out of the bottom of the opening 20. Preferably the drainage is by gravity, and to that end the part providing the opening 20 could be lower than shown so that the water from the planter drains downwardly. Instead of terminating in the opening 20, the pipes could, as shown, terminate below the base 12. Two or more, or all, of the (six) planter drainage pipes 25c could be joined at a connector so that only a single drainage pipe passes into the opening 20.

In use, gravel or other drainage assisting material is placed on the part 15, and this is then covered by the growing medium, e.g. a mixture of soil and compost. The plants are then 'bedded' into the growing medium and 'watered' when necessary. It will be appreciated that excess 'water' will drain away through the drainage openings 24 and into the drainage passages 25. The part 15, although generally flat, could be sloped around each drainage opening 24 to assist the flow of 'water' into each drainage passage 25. Accordingly if plant feed is added to the water for the plants, nitrates or other chemicals in the feed will pass in solution through the drainage passages for discharge away at the underside of the shell. Harmful chemicals applied as feed etc., to the plants when the plants are watered cannot thus reach the water reservoir 11. Thus the recycled water in the reservoir 11 is not contaminated by the water draining from the planter, and although it is not intended that such recycled water should be drunk, it would, if drunk, thus not normally be harmful.

In another arrangement, the plants could be at least partly received in the passages 25, provided drainage therethrough is not prevented.

The gravel and soil etc., carried by the planter upper surface may be relatively heavy, but as mentioned, the part 15 is reinforced by the integrally formed drainage passages, and would thus normally be able to carry such weight without difficulty. The part 15 could of course be otherwise strengthened if necessary.

In use, if the assembly is outdoors, it is possible for rain to pass into the reservoir 11 through the part 16. However in this case, if the level of water in the reservoir rises above the top of the part defining the opening 20, water will drain therethrough until the level falls below the top thereof.

It will be appreciated that the invention applies to an assembly which itself constitutes a water feature, as in the embodiment illustrated, and also to an assembly which is an accessory to a water feature such as an indoor ornamental pond, an outdoor garden pond, or the like. For example the assembly could be arranged to have water flowing into the reservoir from the pond with the electrical pump delivering water from the reservoir back into the pond. Again, however, the planter would drain in isolation from the reservoir and pond.

In another embodiment, a multiplicity of separate planters could be arranged in the form of individual 'pockets' around or at the front of the water feature. Moreover as used herein, the term 'planter' includes an area at which a plant pot or plant dish could be placed, the pot or dish having at least one drainage opening so that liquid applied to the pot or dish drains, in use, to the or each drainage passage of the 'planter'.

Preferably with all the embodiments described, the planter water drains wholly or substantially under gravity, and it is preferred that the exit of each of the drainage passages is in the base 12 to facilitate this. However the drainage passage exits could be other than in the base if required.

In an alternative arrangement, the pump is received in a container beneath part 16 and the container forms the isolated reservoir for the recycled water. The reservoir 11 thus no longer receives recycled water and instead could effectively 'complete' the planter's drainage passages from mouldings 25a or equivalent, to drain water from the planter out of one or more openings in the base 12 or walls 13. Liquid draining from the planter is thus isolated from the recycled water even though the drainage passages here could extend 'around' rather than 'through' the recycled water reservoir.

What is claimed is:

1. An assembly for use as, or forming an accessory for, a water feature comprises:

a water reservoir;
a pump is disposed in the water reservoir for recycling water therein, in use, around at least part of the assembly; and
at least one planter having a drainage passage,
wherein the drainage passage extends through the water reservoir and terminates at a point of discharge form the assembly;
wherein the drainage passage isolates water collected in the planter form water in the water reservoir, in use.

2. An assembly as claimed in claim 1, wherein a base of the planter is defined by an upper wall of the reservoir.

3. An assembly as claimed in claim 2, in the form of a trough, wherein said base is recessed relative to an outer periphery of the trough.

4. An assembly as claimed in claim 2, wherein said drainage passage extends from an opening in said base, through the reservoir, to drain exteriorly, in use.

5. An assembly as claimed in claim 4, wherein the drainage passage is formed integrally with said planter base.

6. An assembly as claimed in claim 5, wherein the drainage passage is formed integrally with a base of the reservoir.

7. An assembly as claimed in claim 5, wherein the drainage passage or the first and second drainage passage parts is or are produced by moulding.

8. As assembly as claimed in claim 4, wherein the drainage passage is made up of a first part integral with said planter base and a second part integral with a base of the reservoir.

9. An assembly as claimed in claim 8, wherein the first and second parts of the drainage passage are tapered.

10. An assembly as claimed in claim 2, wherein the drainage passage is formed by a short passage part extending from said planter base and defining a socket or spigot in or at which a pipe is engaged to complete the drainage passage.

11. An assembly as claimed in claim 10, wherein the pipe extends to and drains from an outlet provided by an upstanding projection.

12. An assembly as claimed in claim 11, wherein electrical flex of a pump in the reservoir passes out of the assembly through said outlet.

13. An assembly as claimed in claim 1, wherein water pumped by the pump, in use, is supplied by means of a pipe connected to the pump to an ornamental member.

14. An assembly as claimed in claim 13, wherein the ornamental member has an outlet through which water is discharged, in use, into the water reservoir.

15. An assembly as claimed in claim 14, wherein the outlet is positioned to discharge water, in use, into an upstanding hollow part which forms an inlet to the water reservoir.

16. An assembly as claimed in claim 1, wherein electrical flex of the pump extends out of the assembly through an opening defined by an upstanding projection extending above the level of water in the water reservoir.

17. An assembly as claimed in claim 16, wherein liquid is arranged to drain, in use, out the assembly through said opening.

18. An assembly as claimed in claim 1, formed in one-piece.

19. An assembly as claimed in claim 18, formed by moulding.

20. An assembly as claimed in claim 1, in the form of a rectangular trough.

21. An assembly as claimed in claim 20, wherein a multiplicity of drainage passages are provided in a surface of the planter intended to receive, in use, growing medium.

22. An assembly as claimed in claim 1, including legs to space a lower surface of the remainder of the assembly from a supporting surface, in use.

23. An assembly for use as, or forming an accessory for, a water feature comprises:
   a water reservoir,
   a pump is disposed in the water reservoir for recycling water therein, in use, around at least part of the assembly; and
   at least one planter disposed in the water reservoir and having drainage passage
   wherein the drainage passage terminates at a point of discharge from the assembly, wherein the drainage passage isolates water collected in the planter form the water in the water reservoir, in use.

24. The assembly of claim 1, wherein the drainage passage is permanently open.

25. The assembly of claim 1, wherein the drainage passage has an opening and an exit in the water reservoir.

26. The assembly of claim 23, wherein the drainage passage is permanently open.

27. The assembly of claim 23, wherein the drainage passage has an opening and an exit in the water reservoir.

28. An assembly for use as, or forming an accessory for, a water feature comprises: a shell assembly; a water reservoir contained in the shell assembly; a pump is disposed in the water reservoir for recycling water therein; and at least one planter contained in the shell assembly and having a drainage passage, where in the drainage passage extends through the shell assembly and terminates at a point of discharge from the shell assembly; wherein the drainage passage isolates water collected in the planter from water in the water reservoir, in use.

* * * * *